United States Patent
Fukuda et al.

(10) Patent No.: US 10,025,061 B2
(45) Date of Patent: Jul. 17, 2018

(54) FOCUS DETECTION APPARATUS, CONTROL METHOD THEREOF, AND STORAGE MEDIUM STORING PROGRAM

(71) Applicant: CANON KABUSHIKI KAISHA, Tokyo (JP)

(72) Inventors: Koichi Fukuda, Tokyo (JP); Yuki Yoshimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 14/318,191

(22) Filed: Jun. 27, 2014

(65) Prior Publication Data

US 2015/0002838 A1 Jan. 1, 2015

(30) Foreign Application Priority Data

Jul. 1, 2013 (JP) ................................ 2013-138336

(51) Int. Cl.
| | |
|---|---|
| *G01J 1/00* | (2006.01) |
| *G02B 7/34* | (2006.01) |
| *H04N 5/232* | (2006.01) |
| *H04N 5/357* | (2011.01) |

(52) U.S. Cl.
CPC ......... *G02B 7/346* (2013.01); *H04N 5/23212* (2013.01); *H04N 5/3572* (2013.01)

(58) Field of Classification Search
CPC ...... F01D 17/165; F02M 26/05; F02M 26/10; F04D 27/002; F04D 29/30; F05D 2220/40; G02B 7/28; G02B 7/346; H04N 5/23212; H04N 5/3572; Y10T 29/49321

USPC .................................................. 356/123–137
See application file for complete search history.

(56) References Cited

U.S. PATENT DOCUMENTS

| | | | | |
|---|---|---|---|---|
| 8,405,760 | B2 * | 3/2013 | Yamasaki | G03B 3/10 348/280 |
| 2009/0295964 | A1 * | 12/2009 | Utagawa | H04N 5/2254 348/302 |
| 2011/0228163 | A1 * | 9/2011 | Isaka | G03B 9/36 348/362 |
| 2012/0147227 | A1 * | 6/2012 | Yoshimura | G02B 7/346 348/246 |

FOREIGN PATENT DOCUMENTS

| | | |
|---|---|---|
| JP | 58-024105 A | 2/1983 |
| JP | 2000-156823 A | 6/2000 |
| JP | 2001-083407 A | 3/2001 |
| JP | 2008-252522 A | 10/2008 |

* cited by examiner

*Primary Examiner* — Tri T Ton

(74) *Attorney, Agent, or Firm* — Canon USA Inc., IP Division

(57) ABSTRACT

Light quantity information of an imaging optical system is acquired according to a focus detection position in an imaging screen. Conversion is performed from the light quantity information and a first aperture value of the imaging optical system, so that the first aperture value is converted into a second aperture value according to the focus detection position. A conversion coefficient is set according to the second aperture value and an exit pupil distance. A correction value to correct output signals from an imaging unit is obtained according to the second aperture value and an exit pupil distance.

26 Claims, 15 Drawing Sheets

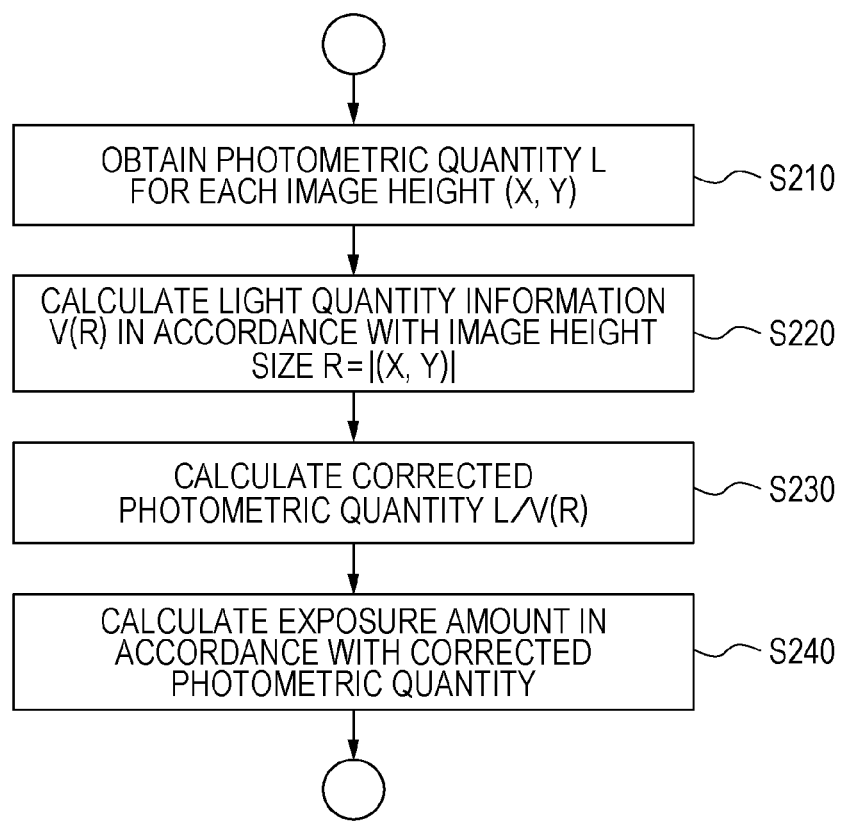

FIG. 11

| CONVERSION COEFFICIENT K(X, Y) | | EXIT PUPIL DISTANCE PO | | |
|---|---|---|---|---|
| | | PO1 | PO2 | PO3 |
| F | F1 | K11 | K12 | K13 |
| | F2 | K21 | K22 | K23 |
| | F3 | K31 | K32 | K33 |
| | F4 | K41 | K42 | K43 |
| | F5 | K51 | K52 | K53 |
| | F6 | K61 | K62 | K63 |
| | F7 | K71 | K72 | K73 |

FIG. 12A
FIG. 12B
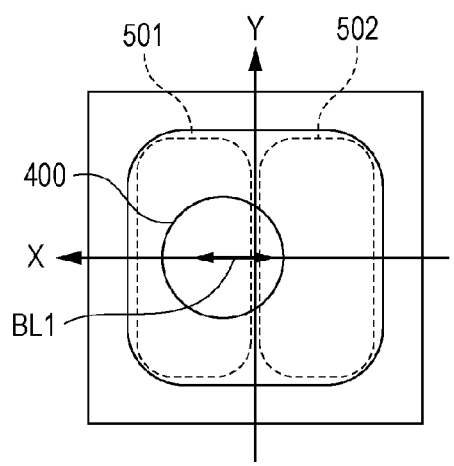
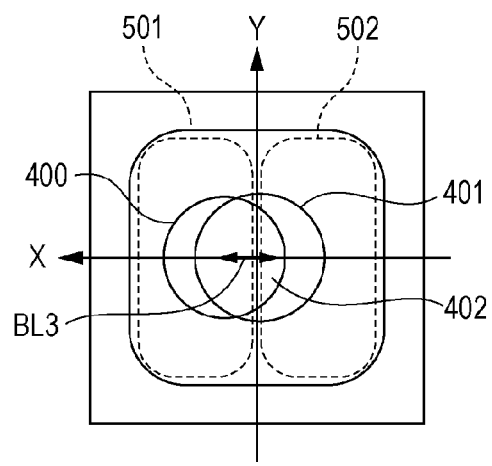
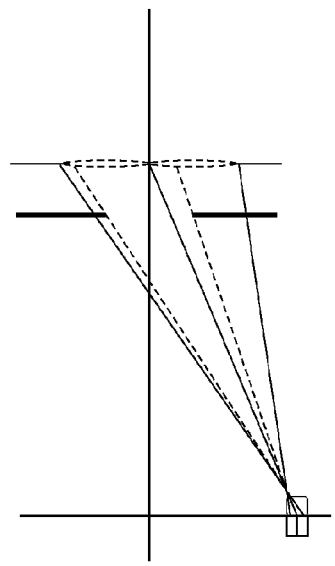
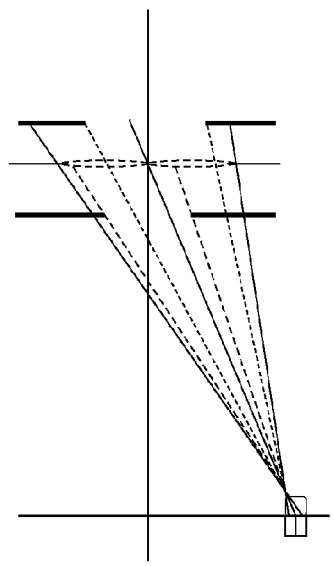

| IMAGE HEIGHT H | LIGHT AMOUNT INFORMATION V |
|---|---|
| H1 | V1 |
| H2 | V2 |
| H3 | V3 |

FIG. 16

| CONVERSION COEFFICIENT K(X, Y) | | EXIT PUPIL DISTANCE PO | | |
|---|---|---|---|---|
| | | PO1 | PO2 | PO3 |
| F | F1 | [s10 TO s25] 11 | [s10 TO s25] 12 | [s10 TO s25] 13 |
| | F2 | [s10 TO s25] 21 | [s10 TO s25] 22 | [s10 TO s25] 23 |
| | F3 | [s10 TO s25] 31 | [s10 TO s25] 32 | [s10 TO s25] 33 |
| | F4 | [s10 TO s25] 41 | [s10 TO s25] 42 | [s10 TO s25] 43 |
| | F5 | [s10 TO s25] 51 | [s10 TO s25] 52 | [s10 TO s25] 53 |
| | F6 | [s10 TO s25] 61 | [s10 TO s25] 62 | [s10 TO s25] 63 |
| | F7 | [s10 TO s25] 71 | [s10 TO s25] 72 | [s10 TO s25] 73 |

FIG. 17

| CONVERSION COEFFICIENT K(X, Y) | | EXIT PUPIL DISTANCE PO | | |
|---|---|---|---|---|
| | | PO1 | PO2 | PO3 |
| F | F1 | [k0 TO k2] 11 | [k0 TO k2] 12 | [k0 TO k2] 13 |
| | F2 | [k0 TO k2] 21 | [k0 TO k2] 22 | [k0 TO k2] 23 |
| | F3 | [k0 TO k2] 31 | [k0 TO k2] 32 | [k0 TO k2] 33 |
| | F4 | [k0 TO k2] 41 | [k0 TO k2] 42 | [k0 TO k2] 43 |
| | F5 | [k0 TO k2] 51 | [k0 TO k2] 52 | [k0 TO k2] 53 |
| | F6 | [k0 TO k2] 61 | [k0 TO k2] 62 | [k0 TO k2] 63 |
| | F7 | [k0 TO k2] 71 | [k0 TO k2] 72 | [k0 TO k2] 73 |

FOCUS DETECTION APPARATUS, CONTROL METHOD THEREOF, AND STORAGE MEDIUM STORING PROGRAM

BACKGROUND OF THE INVENTION

Field of the Invention

The present invention relates to a focus detection apparatus, a control method thereof, and a program, and more particularly it relates to autofocus used in electronic cameras, microscopes, and similar optical systems.

Description of the Related Art

Heretofore, there has been proposed an imaging apparatus where an imaging device, which has a great number of pixels two-dimensionally arrayed such that a relative positions of photoelectric conversions unit are deviated from microlenses and the optical axis thereof, also functions as a focus detection device. This type of focus detection is called "imaging plane phase difference", in which phase difference focus detection is performed by focus detection pixels formed in the imaging device.

Japanese Patent Application Laid-Open No. 58-024105 discloses an imaging apparatus using a two-dimensional imaging device where one microlens, and a photoelectric conversion unit which has been divided into a plurality, are formed for one pixel. The divided photoelectric conversion unit is configured to receive different areas of an exit pupil of a photography lens via the one microlens, thereby performing pupil division. The amount of phase difference is obtained from focus detection signals received from each division of the divided photoelectric conversion units (focus detection pixels), and a defocus amount is calculated from the amount of phase difference and a conversion coefficient, from which phase difference focus detection can be performed. Japanese Patent Application Laid-Open No. 2001-083407 discloses generating imaging signals by adding received focus detection signals at a divided photoelectric conversion unit.

Also, Japanese Patent Application Laid-Open No. 2000-156823 discloses an imaging apparatus where a two-dimensional imaging device made up of multiple imaging pixels partially includes pairs of focus detection pixels. The pair of focus detection pixels are configured so as to receive different areas of the exit pupil of the photography lens, by way of a light shielding layer having openings, thus performing pupil division. Disclosed is acquiring imaging signals from imaging pixels disposed at a great portion of the two-dimensional imaging element, obtaining phase difference from focus detection signals of the partially disposed focus detection pixels, and performing phase difference focus detecting.

Now, there are cases when performing photography in which a part of the light flux traveling toward the focus detecting pixel group is blocked by the imaging optical system (including optical elements such as lenses, diaphragm, and lens barrel holding optical elements), a phenomenon known as "vignetting" occurs. Vignetting causes unevenness in intensity due to lower light quantity in at least one of a pair of generated imaging signals. This unevenness in intensity among focus detection pixels (unevenness in light reception sensitivity) will hereinafter be referred to as "shading". Lower imaging signal level due to vignetting, and shading, may cause the level of similarity of the pair of generated imaging signals to be lower, and thus result in degraded focus detection accuracy.

Accordingly, there has conventionally been disclosed a technology to correct shading of a pair of imaging signals obtained from a pixel group receiving light fluxes which have passed through different exit pupil areas of an imaging optical system. For example, Japanese Patent Application Laid-Open No. 2008-252522 discloses a technique that stores plots of image height and distorted aberration amount at the imaging device, derives an approximation function from these values, and thereby performs correction of lateral difference in distortion, while suppressing the necessary amount of data.

Shading correction has to be performed in a highly accurate manner to realize good focus detection. However, highly accurate shading correction has a problem in that the calculation scale is large, and it takes time for the calculation processing.

Also, exchangeable lenses which have a lens aperture value at the open side and the image height of the imaging device is high, lens frame vignetting may occur due to multiple lens and diaphragm frames, so the effective aperture value changes from lens to lens. Accordingly, depending on the model of the exchangeable lens, a conversion coefficient calculated according to the reference aperture value for middle image height may be insufficient, and focus detection performance may deteriorate.

Therefore, it has been found desirable to improve calculation accuracy in calculating conversion coefficients necessary for converting a phase difference amount among focus detection signals into defocus amount, so as to improve focus detection performance. It has also been found desirable to perform highly accurate shading correction while reducing the amount of calculation processing.

SUMMARY OF THE INVENTION

Provided is control method of a focus detection apparatus, which performs focus detection by phase difference detection based on signals output from an imaging unit which includes a plurality of microlenses being arrayed two-dimensionally over a plurality of photoelectric converters, where a focus adjustment state of an imaging optical system is detected based on the signals output from the imaging unit with respect to one microlens, the method including: acquiring light quantity information of the imaging optical system, according to a focus detection position in an imaging screen; converting, based on the light quantity information and a first aperture value of the imaging optical system, the first aperture value into a second aperture value according to the focus detection position; and setting a conversion coefficient according to the second aperture value and an exit pupil distance.

Also provided is a control method of a focus detection apparatus which performs focus detection by phase difference detection to detect a focus adjustment state of an imaging optical system, based on output signals of a pair of photoelectric converters which perform photoelectric conversion of a pair of light fluxes obtained by pupil division of light which has been transmitted through the imaging optical system, and output image signals, the method including: acquiring light quantity information of the imaging optical system, according to a focus detection position in an imaging screen; converting, based on the light quantity information and a first aperture value of the imaging optical system, the first aperture value into a second aperture value according to the focus detection position; and setting a conversion coefficient according to the second aperture value and an exit pupil distance.

Further features of the present invention will become apparent from the following description of exemplary embodiments with reference to the attached drawings.

BRIEF DESCRIPTION OF THE DRAWINGS

FIG. 9 is a flowchart illustrating exposure calculation processing according to the first embodiment of the present invention.

FIG. 11 illustrates an example of a storage format for defocus conversion coefficients according to the first embodiment of the present invention.

FIGS. 12A and 12B are schematic explanatory diagrams of frame vignetting of the first focus detection signal and second focus detection signal according to the first embodiment of the present invention.

FIG. 16 illustrates an example of a storage format for shading correction coefficients according to the second embodiment of the present invention.

FIG. 17 illustrates an example of a storage format for defocus conversion coefficients according to the second embodiment of the present invention.

DESCRIPTION OF THE EMBODIMENTS

Exemplary embodiments of the present invention will be described in detail with reference to the drawings.

First Embodiment
Overall Configuration

Figure 1:
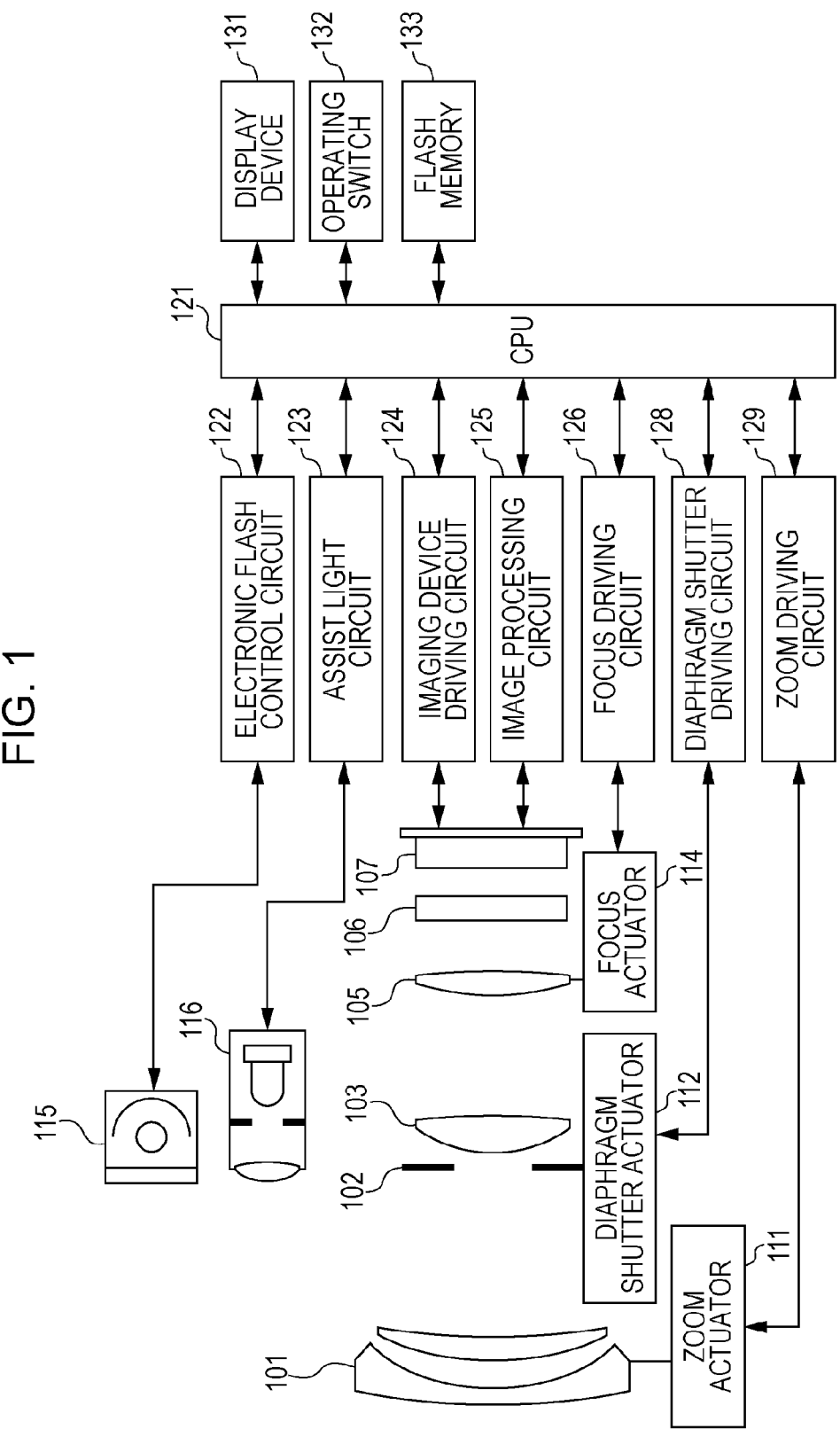
FIG. 1 is a schematic configuration diagram of an imaging apparatus according to a first embodiment of the present invention.

FIG. 1 is a configuration diagram of a camera, which is an example of an imaging apparatus having an imaging device according to the present invention. Reference numeral 101 denotes a first lens group disposed at the far end (object side) of an imaging optical system, held so as to advance and retreat in the optical axis direction. Reference numeral 102 denotes a diaphragm shutter, which functions as a diaphragm by adjusting an aperture diameter to adjust entry of light quantity when shooting, and also functions as a shutter for adjusting exposure time during still image shooting. Reference numeral 103 denotes a second lens group. The diaphragm shutter 102 and second lens group 103 integrally advance/retreat in the optical axis direction, and realize magnification variation (zoom function) in conjunction with advancing/retreating actions of the first lens group 101.

A third lens group 105, also called a focus lens, performs focus adjustment by advancing/retreating in the optical axis direction. Reference numeral 106 denotes an optical low-pass filter, which is an optical element to alleviate false color and moiré in shot images. Reference numeral 107 denotes an imaging device 107. The imaging device 107 includes, for example, a two-dimensional CMOS photosensor and peripheral circuits, and is disposed at the image-forming plane (on the image side) of the imaging optical system.

Reference numeral 111 denotes a zoom actuator 111 which drives the first lens group 101 and/or second lens group 103 so as to advance/retract in the direction of the optical axis by turning a cam barrel which is omitted from illustration in FIG. 1. Reference numeral 112 denotes a diaphragm shutter actuator which controls the aperture diameter of the diaphragm shutter 102 so as to adjust an amount image-taking light, and also to control exposure time during still image shooting. Reference numeral 114 denotes a focus actuator which drives the third lens group 105 so as to advance/retreat in the optical axis direction, thereby performing focus adjustment.

Reference numeral 115 denotes an electronic flash to irradiate (illuminate) the subject with light when shooting in low-light conditions. A flash lighting device using a xenon tube is preferable, but a lighting device having continuous-emission LEDs (light-emitting diodes), or similar light sources may be used, as the electronic flash. An auto-focus (AF) assist light device 116 projects an image of a mask having a predetermined opening pattern onto an image sensing field by way of a projection lens, thereby improving focus detection capabilities for dark subjects and low-contrast subjects.

Reference numeral 121 denotes a camera control unit (camera controller) which governs various types of control of the camera main body. The control unit 121 includes an in-camera (central processing unit) CPU implemented by one or more microprocessors, a calculation unit, read-only memory (ROM), random access memory (RAM), an A/D converter, a D/A converter, a communication interface circuit, and so forth. The control unit 121 drives various types of circuits which the camera has based on predetermined programs stored in the ROM, and executes a series of processes such as autofocusing, imaging, image processing, recording, and so forth.

The control unit 121 also stores correction value calculation coefficients, which are necessary in focus adjustment using imaging device outputs signals, described later. Multiple correction value calculation coefficients are provided for focus state corresponding to the position of the third lens group 105, zoom state corresponding to the positions of the first lens group 101 and second lens group 103, F-number of the imaging optical system, set pupil distance of the imaging device, and pixel size. An optimal correction value calculation coefficient is selected in accordance with a combination of the focus adjustment state of the imaging optical system (focus state and zoom state) and aperture value, the set pupil distance of the imaging device, and pixel size, at the time of performing focus adjustment. A correction value is then calculated from the selected correction value calculation coefficient and the image height of the imaging device.

According to the first embodiment, the imaging apparatus is configured in a manner where the correction value calculation coefficients are stored in the control unit 121, but storage is not restricted thusly. For example, an arrangement may be made in an imaging apparatus using exchangeable lenses where an exchangeable lens having the imaging optical system also has nonvolatile memory, and stores the correction value calculation coefficients in the memory of the exchangeable lens. In this case, the correction value calculation coefficients may be transmitted to the imaging apparatus according to the focus adjusting state of the imaging optical system.

Referring still to FIG. 1, reference numeral 122 denotes an electronic flash control circuit, which controls lighting of the electronic flash 115 synchronously with shooting operations. Reference numeral 123 denotes an auxiliary (assist) light driving circuit, which controls lighting of the AF assist light device 116 synchronously with the focus detection operation. Reference numeral 124 denotes an imaging device driving circuit, which controls imaging operations by the imaging device 107, and also performs A/D (analog-to-digital) conversion of the acquired image signals and transmits digital image signals to the control unit 121. Reference numeral 125 denotes an image processing circuit which performs γ conversion, color interpolation, JPEG compression, and so forth, of the image which the imaging device 107 has acquired.

Reference numeral 126 denotes a focus driving circuit which controls driving of the focus actuator 114 based on focus detection results, so that focus adjustment is performed by advancing/retracting the third lens group 105 in the optical axis direction. Reference numeral 128 denotes a diaphragm shutter driving circuit, which controls driving of the diaphragm shutter actuator 112, so that the aperture of the diaphragm shutter 102 is controlled. Reference numeral 129 denotes a zoom driving circuit, which drives the zoom actuator 111 in accordance with zoom operations performed by a photographer.

Reference numeral 131 denotes a display device such as a liquid crystal display (LCD), on which display is made of information relating to the shooting mode of the camera, preview images before shooting and confirmation images after shooting, a focus detection area frame and an in-focus display image during focus detection, and so forth. An operating switch group 132 is configured including a power switch, release (shooting trigger) switch, zoom operation switch, shooting mode selection switch, and so forth. Reference numeral 133 denotes detachable flash memory, which records acquired images.

Imaging Device

Figure 2:
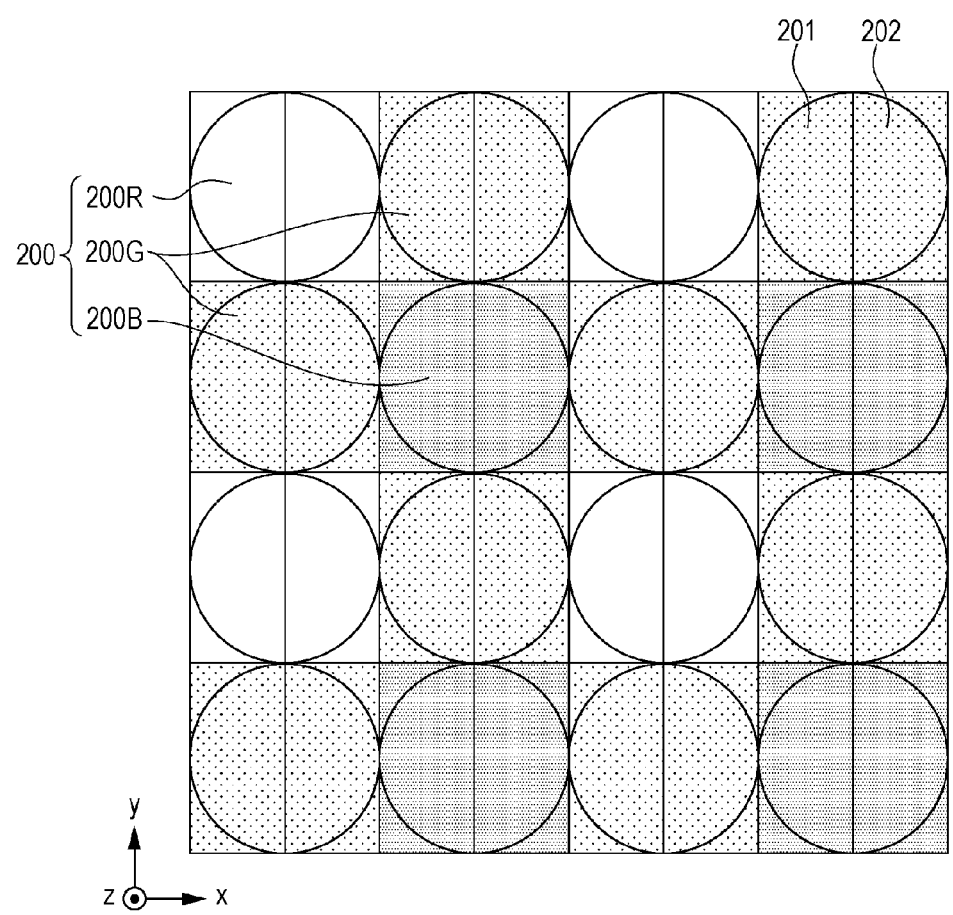
FIG. 2 is a schematic diagram of a pixel array according to the first embodiment of the present invention.

FIG. 2 illustrates a schematic diagram of an array of imaging pixels (and focus detection pixels) in the imaging device according to the first embodiment.

FIG. 2 illustrates an exemplary pixel (imaging pixels) array of a two-dimensional CMOS sensor (imaging device) according to the first embodiment over a 4-column×4-row range, and a focus detection pixel array over an 8-column×4-row range.

A 2-column×2-row pixel group 200 illustrated in FIG. 2 according to the first embodiment includes a pixel 200R having red (R) spectral sensitivity situated at the upper left, two pixels 200G having green (G) spectral sensitivity at the upper right and lower left, and a pixel 200B having blue (B) spectral sensitivity at the lower right. Each pixel 200 is further configured as a first focus detection pixel 201 and a second focus detection pixel 202 arrayed in a 2-column×1-row array.

A large number of the 4-column×4-row pixel arrays (8-column×4-row range focus detection pixel arrays), as illustrated in FIG. 2, are arrayed on the light-receiving surface of the imaging device 107, thus enabling a sensed image (focus detection signals) to be acquired. The first embodiment will be described regarding an imaging device where the pixel cycle P is 4 μm, the number of pixels N is 5,575 columns horizontally×3,725 rows vertically for a total of approximately 20.75 million image detection pixels, and where the focus detection pixel cycle P is 2 μm in the horizontal direction, the number of focus detection pixels $N_{AF}$ is 11,150 columns horizontally×3,725 rows vertically for a total of approximately 41.5 million focus detection pixels.

Figure 3:
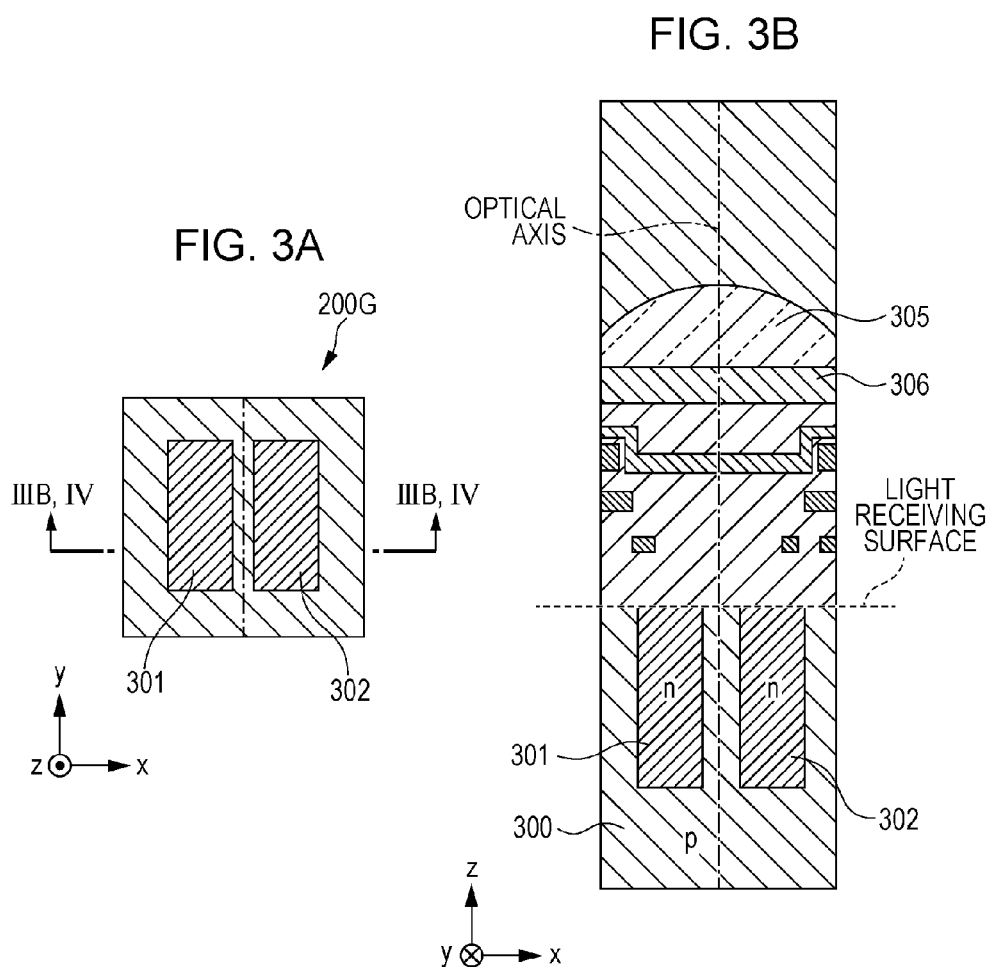
FIG. 3A is a schematic plan view of a pixel according to the first embodiment of the present invention.
FIG. 3B is a schematic cross-sectional view of the pixel.

FIG. 3A illustrates a plan view of one pixel 200G of the imaging device illustrated in FIG. 2, as viewed from the light-receiving surface side (+z side), and FIG. 3B illustrates a cross-sectional view of the pixel 200G illustrated in FIG. 3A, taken along line IIIB-IIIB, as viewed from the −y side.

The one pixel 200G according to the first embodiment has a microlens 305 formed at the light-receiving side of each pixel to collect incident light, and a photoelectric conversion unit 301 and photoelectric conversion unit 302 formed which are divided into $N_H$ in the x direction (divided into two) and $N_V$ in the y direction (divided into one), as illustrated in FIGS. 3A and 3B. The photoelectric conversion unit 301 and photoelectric conversion unit 302 correspond to the first focus detection pixel 201 and second focus detection pixel 202, respectively.

The photoelectric conversion unit 301 and photoelectric conversion unit 302 may be a pin photodiode where an intrinsic layer is sandwiched between a p-type layer and n-type layer, or may be a p-n junction phototransistor where the intrinsic layer is omitted, as necessary.

Each pixel includes a color filter 306 formed between the microlens 305 and the photoelectric conversion unit 301 and photoelectric conversion unit 302. Alternatively, the spectral transmittance of the color filter may be changed for each sub-pixel, or the color filter may be omitted, as necessary.

Incident light to the pixel 200G in FIGS. 3A and 3B is collected by the microlens 305, spectrally dispersed at the color filter 306, and received at the photoelectric conversion unit 301 and photoelectric conversion unit 302.

Pairs of electrons and holes are generated at the photoelectric conversion unit 301 and photoelectric conversion unit 302 in accordance with the quantity of received light, separated at a depletion layer, and then electrons with a negative charge are accumulated at an n-type layer omitted from illustration, while on the other hand the holes are externally discharged from the imaging device through a p-type layer that is connected to a constant-voltage source, also omitted from illustration.

Electrons accumulated at the n-type layer (omitted from illustration) of the photoelectric conversion unit 301 and photoelectric conversion unit 302 are transferred to a capacitance portion (FD) via a transfer gate, and converted into voltage signals.

Figure 4:
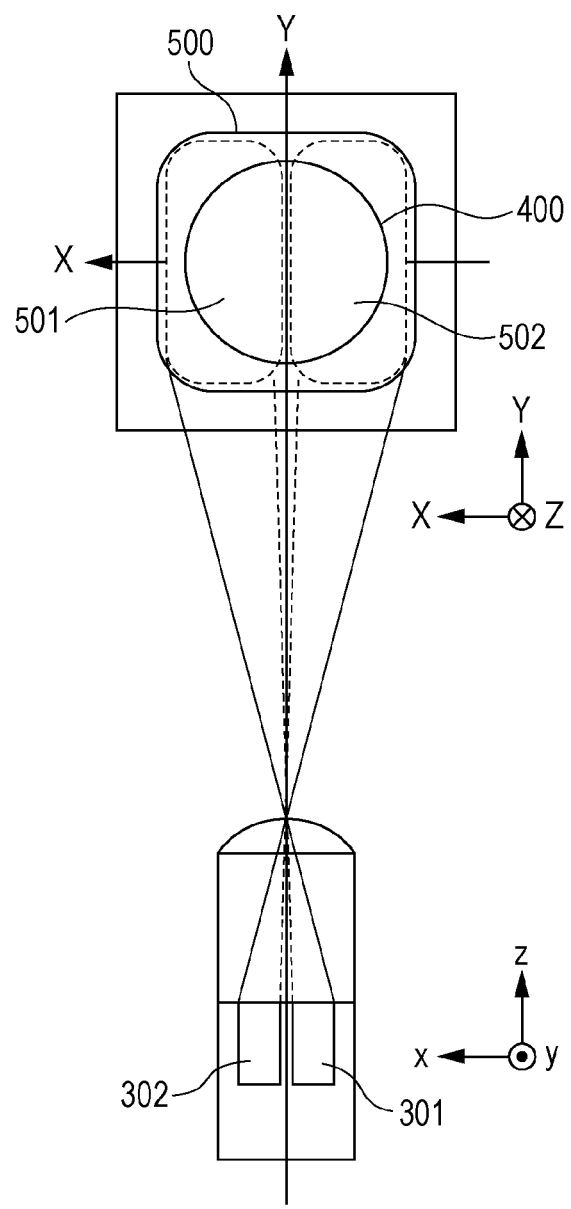
FIG. 4 is a schematic explanatory diagram regarding a pixel and pupil division according to the first embodiment of the present invention.

FIG. 4 is a schematic explanatory diagram illustrating the correspondence between the pixel structure illustrated in FIGS. 3A and 3B, and pupil division. FIG. 4 illustrates a cross-sectional view of the pixel structure according to the first embodiment illustrated in FIG. 3A, taken along line IV-IV, as viewed from the +y side, and the exit pupil plane of the imaging optical system. The x-axis and y-axis have been inverted from FIGS. 3A and 3B in FIG. 4, for correlation with the coordinates axes of the exit pupil plane.

A first pupil partial area 501 of the first focus detection pixel 201 in FIG. 4 is in a generally conjugate relation with the light-receiving surface of the photoelectric conversion unit 301 of which the center of gravity is decentered in the −x direction, by the microlens, and represents a pupil area at which the first focus detection pixel 201 can receive light. The center of gravity of the first pupil partial area 501 of the first focus detection pixel 201 is decentered to the +X side on the pupil plane.

A second pupil partial area 502 of the second focus detection pixel 202 in FIG. 4 is in a generally conjugate relation with the light-receiving surface of the photoelectric conversion unit 302 of which of which the center of gravity is decentered in the +x direction, by the microlens, and represents a pupil area at which the second focus detection pixel 202 can receive light. The center of gravity of the second pupil partial area 502 of the second focus detection pixel 202 is decentered to the −X side on the pupil plane.

A pupil area 500 in FIG. 4 is a pupil area capable of receiving light at the entire pixels 200G, with the photoelectric conversion unit 301 and photoelectric conversion unit 302 (first focus detection pixel 201 and second focus detection pixel 202) combined.

An imaging plane phase difference AF is affected by diffraction due to performing pupil division using the microlens of the imaging device. While the pupil distance to the exit pupil plane is several tens of mm in FIG. 4, the diameter of the microlens is several μm accordingly, the aperture value of the microlens is in the order of tens of thousands, so diffraction blurring in tens of mm occurs. Accordingly, the image at the light-receiving surface of the photoelectric conversion unit is not a clear pupil area or pupil partial area, but a pupil intensity distribution (incident angle distribution of light-receiving rate).

Figure 5:
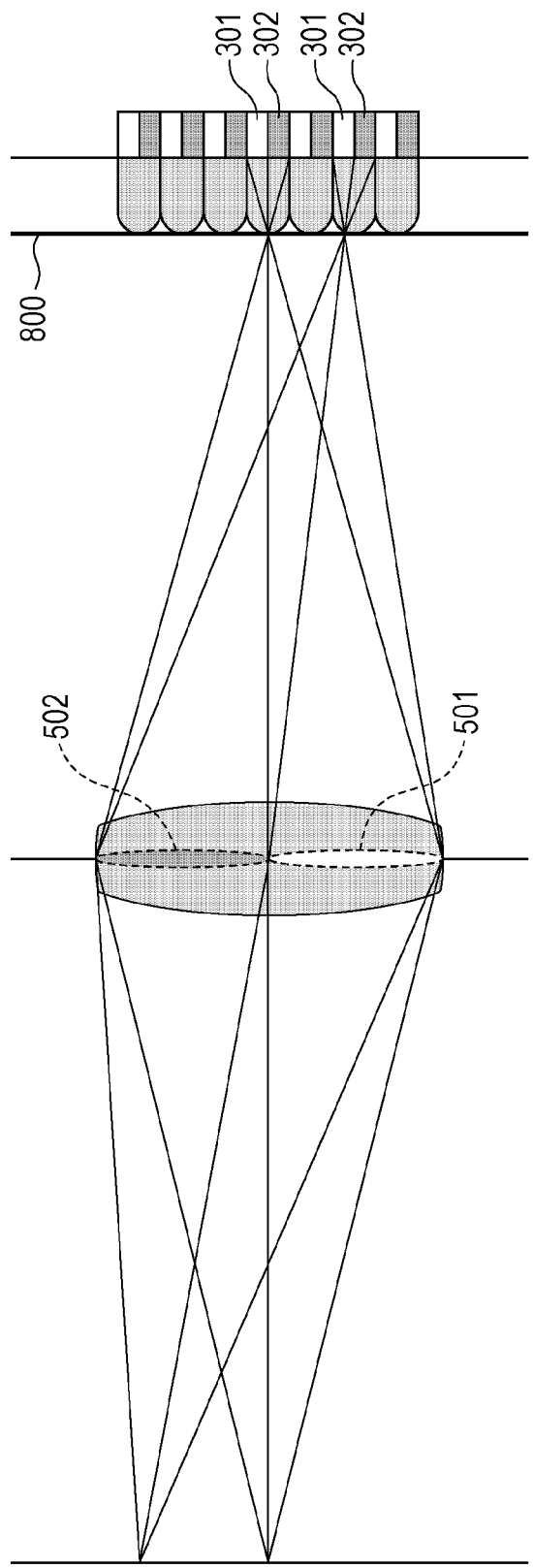
FIG. 5 is a schematic explanatory diagram regarding an imaging device and pupil division according to the first embodiment of the present invention.

FIG. 5 illustrates a schematic diagram illustrating the correspondence between the imaging device according to the first embodiment and pupil division. Light fluxes which have passed through different pupil partial areas, the first pupil partial area 501 and the second pupil partial area 502 are each input to each pixel of the imagine device from different angles, and received at the halved first focus detection pixel 201 and second focus detection pixel 202. The first embodiment is an example of the pupil area having been subjected to pupil division into two. Pupil division in the horizontal area may be performed as necessary.

Multiple imaging pixels each having a first focus detection pixel and a second focus detection pixel are arrayed on the imaging device according to the first embodiment.

The first focus detection pixel receives the light flux passing through the first pupil partial area of the imaging optical system. The second focus detection pixel receives the light flux passing through the second pupil partial area of the imaging optical system, which is different from the first pupil partial area. The imaging pixel receives the light fluxes which have passed through the entire pupil area, which includes the first pupil partial area and the second pupil partial area combined. Each imaging pixel in the imaging device according to the first embodiment is configured including a first focus detection pixel and second focus detection pixel.

Alternatively, an arrangement may be made where the imaging pixel, first focus detection pixel, and second focus detection pixel, are configured as separate pixels, and first focus detection pixels and second focus detection pixels are partially positioned in a part of an imaging pixel array.

In the first embodiment, the light-reception signals of the first focus detection pixel 201 in each pixel of the imaging device are collected to generate a first focus signal, and light-reception signals of the second focus detection pixel 202 in each pixel are similarly collected to generate a second focus signal. Additionally, the signals of the first focus detection pixel 201 and second focus detection pixel 202 are added for each pixel of the imaging device, thereby generating imaging signals (a sensed image) having a resolution of the number of effective pixels N.

Relation Between Defocus Amount and Phase Difference Amount

The relation between the amount of phase difference and defocus amount of a first focus detection signal and a second focus detection signal obtained by the imaging device according to the first embodiment will be described.

Figure 6:
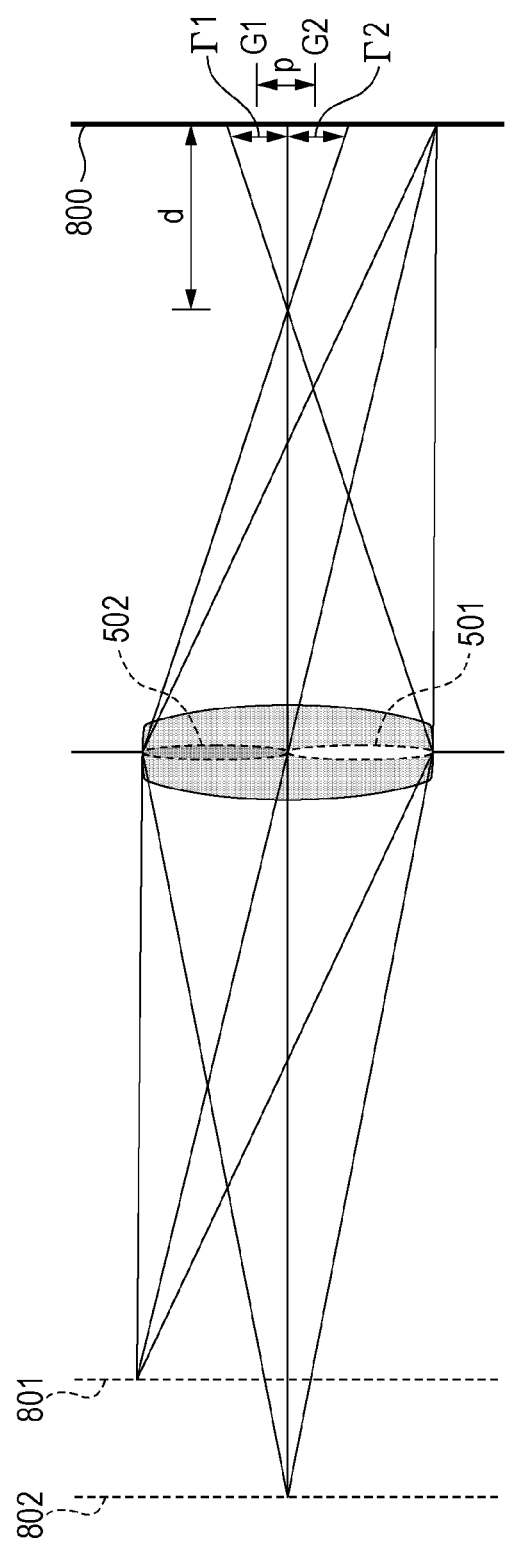
FIG. 6 is a schematic relational diagram regarding amount of phase difference and defocus amount of a first focus detection signal and a second focus detection signal according to the first embodiment of the present invention.

FIG. 6 is a schematic relational diagram regarding amount of phase difference and defocus amount of a first focus detection signal and a second focus detection signal according to the first embodiment of the present invention. The imaging device according to the first embodiment (omitted from illustration) is placed at an imaging plane 800, and the exit pupil of the imaging optical system is divided into two, into the first pupil partial area 501 and second pupil partial area 502, in the same way as in FIGS. 4 and 5.

A defocus amount d is defined such that the largest distance from the image-forming position of the subject to the imaging plane is $|d|$. A front focus state where the image-forming position of the subject is on the subject side of the imaging plane is expressed by a negative sign (d<0), and a back focus state where the image-forming position of the subject is on the opposite side of the imaging plane from the subject is expressed by a positive sign (d>0). An in-focus state where the image-forming position of the subject is on the imaging plane is expressed by d=0. Subject 801 in FIG. 6 illustrates an example of an in-focus state (d=0), and subject 802 illustrates an example of front focus (d<0). Together, the front focus state (d<0) and back focus state (d>0) make up a defocus state ($|d|$>0).

In the front focus state (d<0), of the light fluxes from the subject 802, the light flux which has passed through the first pupil partial area 501 (second pupil partial area 502) is first collected and then spreads to a width Γ1 (Γ2) centered on the center-of-gravity position G1 (G2) of the light flux, yielding a blurred image on the imaging plane 800. The blurred image is received by the first focus detection pixel 201 (second focus detection pixel 202) making up each pixel arrayed on the imaging device, and a first focus detection signal (second focus detection signal) is generated. The first focus detection signal (second focus detection signal) is recorded as a blurred subject image at the center-of-gravity position G1 (G2) on the imaging plane 800, as a subject 802 having a width Γ1 (Γ2). The blurring width Γ1 (Γ2) of the subject image increases generally proportionately to an increase of the amount $|d|$ of the defocus amount d. In the same way, the largest of phase difference amount p of the subject between the first focus detection signal and second focus detection signal (difference G1−G2 in center-of-gravity positions of light fluxes), written as $|p|$, also increases generally proportionately to increase of the amount |d| of the defocus amount d. This also holds true for a back focus state (d>0), though the direction of subject image phase difference between the first focus detection signal and second focus detection signal is opposite of the front focus state.

Accordingly, in the first embodiment, the value of phase difference amount between the first focus detection signal and second focus detection signal increases as the amount of defocus of the first focus detection signal and second focus detection signal increase, or as the amount of defocus of an imaging signal obtained by adding the first focus detection signal and second focus detection signal, increase.

Focus Detection

Focus detection in the phase difference method according to the first embodiment will be described. Focus detection in the phase difference method according to the first embodiment involves relatively shifting the first focus detection signal and second focus detection signal, and calculating a correlation representing the degree of matching of the signals. The phase difference amount is detected from a shift amount where the correlation (degree of signals matching) improves. As the largest of defocus amount of the imaging signals increases, the phase difference amount between the first focus detection signal and second focus detection signal increases, and based on this relationship, phase difference amount is converted in to a detection defocus amount by a conversion coefficient, thereby performing focus detection.

Figure 7:
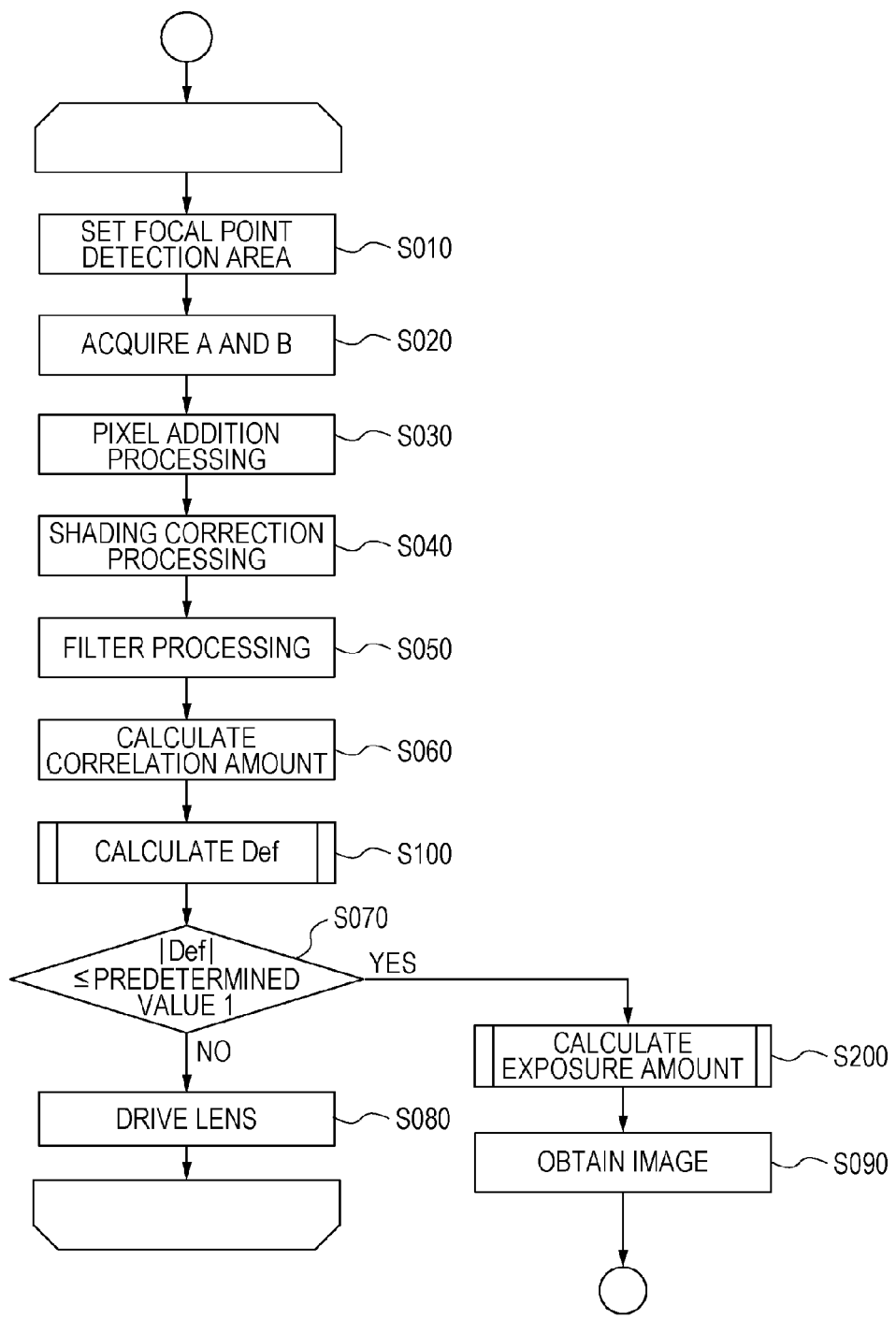
FIG. 7 is a flowchart illustrating focus detection processing and imaging processing according to the first embodiment of the present invention.

FIG. 7 is a flowchart illustrating first focus detection processing according to the first embodiment. The operations in FIG. 7 are executed by the imaging device 107, image processing circuit 125, and control unit 121.

In step S010, a focus detection area centered on an image height (X, Y) regarding which focus adjustment is to be performed is set from out of the effective pixel area of the imaging device.

In step S020, a first focus detection signal is generated from a received-light signal of a first focus detection pixel in the focus detection area, and a second focus detection signal is generated from a received-light signal of a second focus detection pixel in the focus detection area.

In step S030, three pixels in the column direction are added to the first focus detection signal and second focus detection signal to suppress signal data amount. Further, Bayer (RGB) addition processing to obtain luminance signals from RGB signals is performed. These two addition processes are collectively referred to as "pixel addition processing".

In step S040, shading correction processing (optical correction processing) is performed on each of the first focus detection signal and second focus detection signal.

Figure 10C:
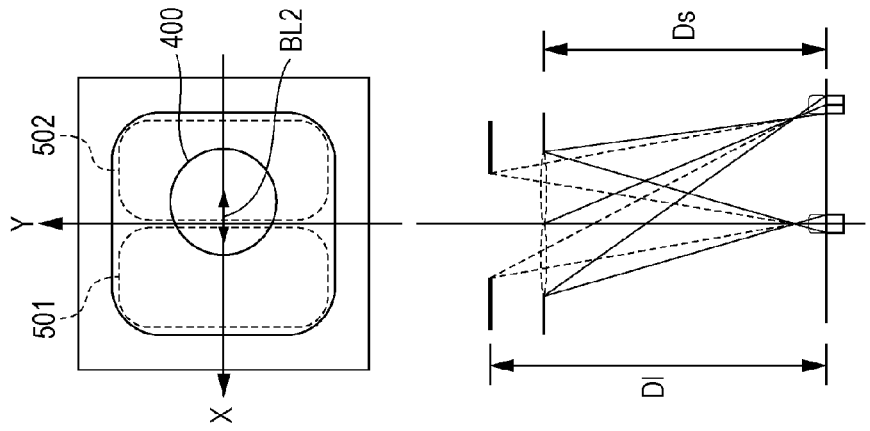
FIGS. 10A, 10B, and 10C are schematic explanatory diagrams regarding pupil shift between the first focus detection signal and second focus detection signal according to the first embodiment of the present invention.
Figure 10B:
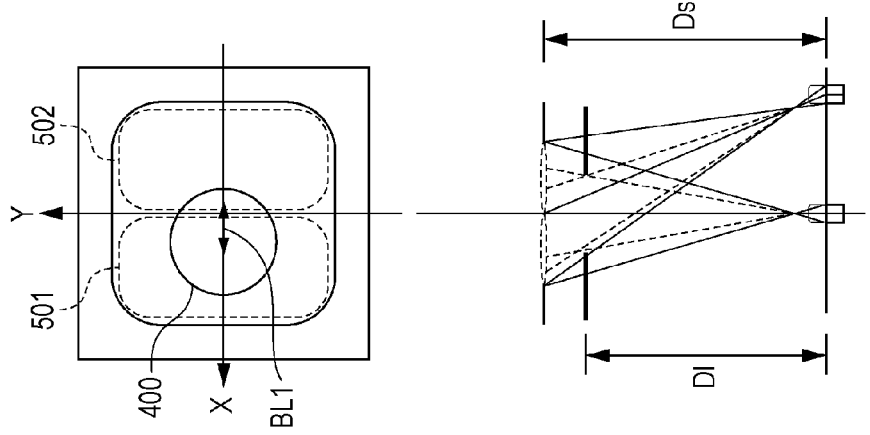
Figure 10A:
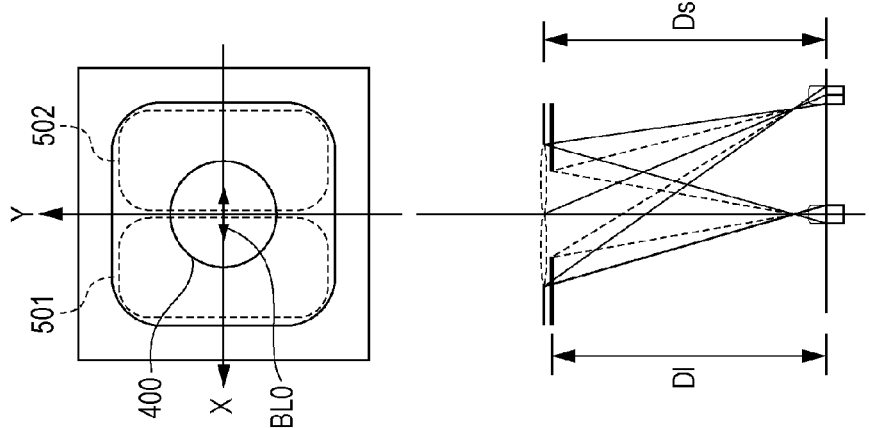

Hereinafter, description will be made regarding change in conversion coefficients necessary to convert phase difference amount due to pupil shift between the first focus detection signal and second focus detection signal into detection defocus amount, and regarding shading. FIGS. 10A, 10B and 10C illustrate the relation between base lengths BL0, BL1, and BL2, the first pupil partial area 501 of the first focus detection pixel 201 and the second pupil partial area 502 of the second focus detection pixel 202 at the peripheral image height of the imaging pixel, and the exit pupil 400 of the imaging optical system.

FIG. 10A illustrates a case where an exit pupil distance D1 of the imaging optical system and set pupil distance Ds of the imaging device are the same. In this case, the exit pupil 400 of the imaging optical system is subjected to generally equal pupil division by the first pupil partial area 501 and second pupil partial area 502. BL0 represents the base length which is the interval between the center of gravity of the first pupil partial area 501 and the center of gravity of the second pupil partial area 502 within the exit pupil 400. Here, a conversion coefficient K0 necessary for conversion from phase difference amount into detection defocus amount is obtained by K0=Ds/BL0.

On the other hand, FIG. 10B illustrates a case where the exit pupil distance D1 of the imaging optical system is shorter than the set pupil distance Ds of the imaging device. In this case, pupil shift occurs between the exit pupil of the imaging optical system and the incident pupil of the imaging optical system, resulting in the exit pupil 400 of the imaging optical system being subjected to unequal pupil division. Accordingly, the base length BL1 is biased to one side, and accordingly the conversion coefficient changes to K1=Ds/BL1.

In the same way, FIG. 10C illustrates a case where the exit pupil distance D1 of the imaging optical system is longer than the set pupil distance Ds of the imaging device. In this case, pupil shift occurs between the exit pupil of the imaging optical system and the incident pupil of the imaging optical system, resulting in the exit pupil 400 of the imaging optical system being subjected to unequal pupil division. Accordingly, the base length BL2 is biased to the opposite side from that illustrated in FIG. 10B, and the conversion coefficient changes to K2=Ds/BL2.

The greater the inequality in pupil division at peripheral image height, the greater the inequality in intensity of the first focus detection signal and second focus detection signal is, meaning that one of the first focus detection signal and second focus detection signal grows stronger and the other weaker. This is called shading.

Further, as the aperture value of the imaging optical system changes, the size of the exit pupil 400 in FIGS. 10A through 10C changes, and it can be seen that the conversion coefficient and shading change in accordance with the aperture value as well. Accordingly, it can be understood that the conversion coefficient for conversion from phase difference amount to detection defocus amount, and shading, change according to the aperture value of the imaging optical system and exit pupil distance, pupil intensity distribution of the imaging device (optical properties), and image height.

Referring back to FIG. 7, in step S040, a first shading correction coefficient for the first focus detection signal, and a second shading correction coefficient for the second focus detection signal, are generated in accordance with the image height at the focus detection area, the F value of the imaging lens (imaging optical system), and the exit pupil distance. Shading correction processing (optical correction processing) of the first focus detection signal and second focus detection signal is performed where the first focus detection signal is multiplied by the first shading correction coefficient, and the second focus detection signal is multiplied by the second shading correction coefficient.

First focus detection in the phase difference method involves detecting a detection defocus amount based on correlation of the first focus detection signals and second focus detection signal (degree of match of signals). There are cases where occurrence of shading will reduce the correlation of the first focus detection signals and second focus detection signal (degree of match of signals). Accordingly, shading correction processing (optical correction processing) is preferably performed to improve the correlation of the first focus detection signals and second focus detection signal (degree of match of signals) for better focus detection performance.

While description has been made of pupil shift regarding a case where the set pupil distance of the imaging device is unchanged and the exit pupil distance of the imaging optical system changes, the same holds for an opposite case where the exit pupil distance of the imaging optical system is unchanged and the set pupil distance of the imaging device changes. In focus detection by imaging plane phase difference, the light flux which the focus detection pixels (first focus detection pixel and second focus detection pixel) receive and the light flux which the imaging pixel receives change as the set pupil distance of the imaging device changes.

In step S050 in FIG. 7, the first focus detection signal and second focus detection signal are subjected to band-pass filtering at a particular passing frequency band, to improve focus detection accuracy by improving correlation (degree of match of signals). Examples of band-pass filters include difference filters such as $\{1, 4, 4, 4, 0, -4, -4, -4, -1\}$ to cut out DC components and perform edge extraction, and addition filters such as $\{1, 2, 1\}$ to suppress high-frequency noise components.

Next, in step S060 in FIG. 7, shift processing is performed to shift the post-filtering first focus detection signal and second focus detection signal relatively in the pupil-divided direction, and calculate correlation amount representing the degree to which the signals match.

In the following Expression (1), the term A(k) represents the k'th first focus detection signal after filtering, B(k) represents the k'th second focus detection signal after filtering, W represents the range of the number k as to the focus detection area, s represents shift amount, Γ represents the shift range of the shift amount s. Expression (1) yields COR, which is the correlation amount.

$$COR(s) = \sum_{k \in W} |A(k) - B(k-s)|, s \in \Gamma \quad (1)$$

In shift processing of shift amount s, the k'th first focus detection signal A(k) and the k-s'th second focus detection signal B(k-s) are correlated and B(k-s) is subtracted from A(k) to generate a shift subtraction signal. The absolute value of the generated shift subtraction signal is calculated, the sum of the number k within the range W corresponding to the focus detection area is obtained, and a correlation amount COR(s) is calculated. Alternatively, the correlation amount calculated over each row may be added to multiple rows, for each shift amount.

In step S100, a real-valued shift amount where the correlation amount is the minimum value is calculated, by sub-pixel calculation, and taken as phase difference amount p. The phase difference amount p is multiplied by a conversion coefficient K so as to obtain a detection defocus amount (Def). The conversion coefficient K corresponds to the image height of the focus detection area, the F value of the imaging lens (imaging optical system), and the exit pupil distance.

In the first embodiment, the correlation amount is calculated from the first focus detection signal and second focus detection signal by a focus detector using phase difference, and the detection defocus amount is obtained based on the correlation amount.

Figure 8:
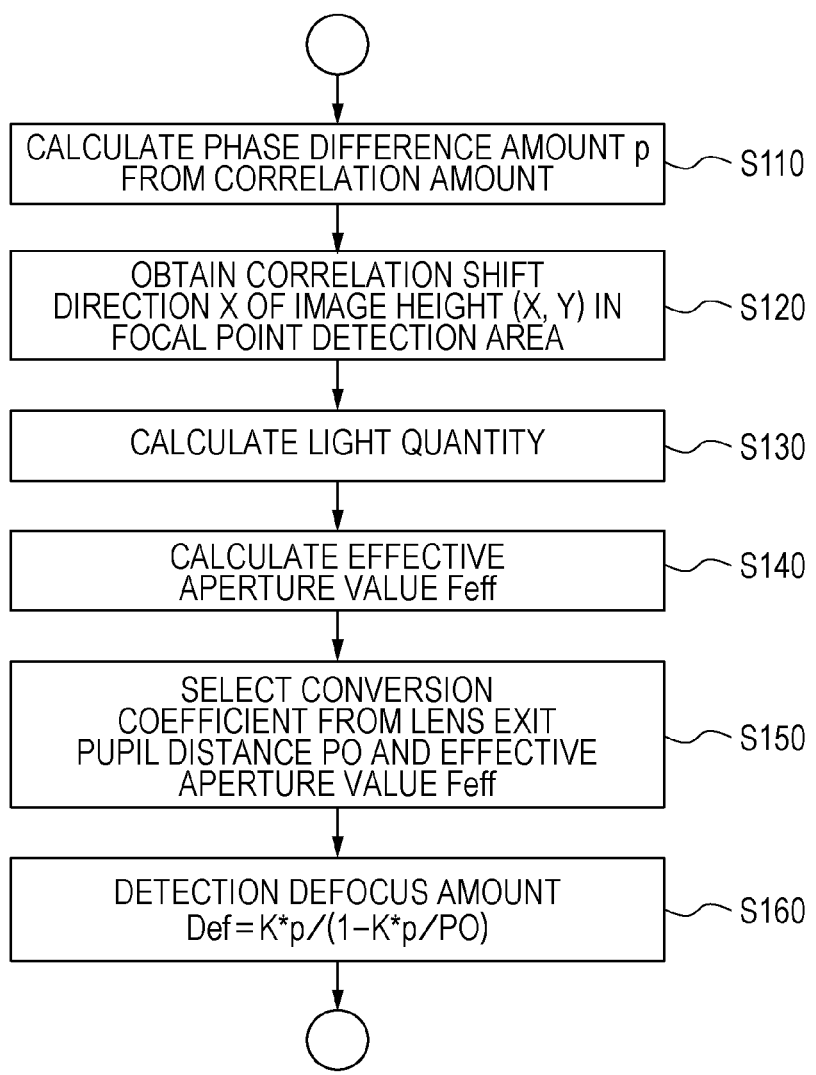
FIG. 8 is a flowchart illustrating calculation processing of detected defocus amount according to the first embodiment of the present invention.

Processing to calculate the detection defocus amount described in step S100 in FIG. 7 will now be described in detail. FIG. 8 is a flowchart illustrating details of the calculation processing of detection defocus amount.

In step S110, the phase difference amount p is calculated based on the correlation amount, by sub-pixel calculation.

In step S120, the correlation shift direction (image height in the horizontal direction, which is the pupil division direction in the first embodiment) X in the image height (X, Y) in the focus detection area is obtained.

In step S130, light quantity information V (X) corresponding to an absolute value |X| in the correlation shift direction X of the image height in the focus detection area is obtained.

Figures 13, 14:
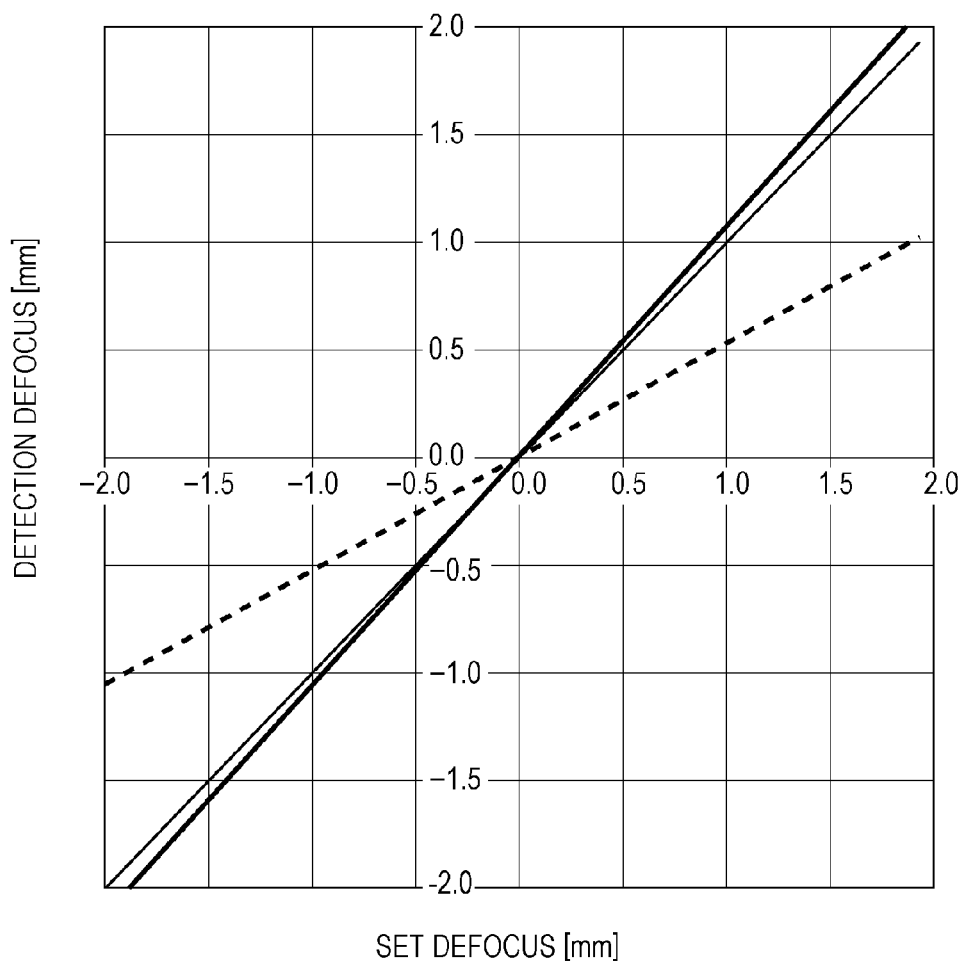
FIG. 13 illustrates an example of a storage format for lens light quantity information according to the first embodiment of the present invention.
FIG. 14 illustrates an example of improving defocus conversion coefficients according to the first embodiment of the present invention.

FIG. 13 illustrates light quantity information (information of light quantity reduction due to lens frame vignetting) used for exposure adjustment, that has been stored in correspondence with the image height of the focus detection area. One way to calculate the light quantity information V (X) in a case of usage in focus detection is to use the absolute value |X| in the X direction (correlation shift direction) of the image height in the focus detection area (Expression (2)), and to select a closest image height H from the light quantity information V discretely stored by image height in FIG. 13. Alternatively, in a case of calculating the light quantity information V more precisely, two points of light quantity information near the image height may be interpolated to calculate the light quantity information. Therefore the light quantity information according to a focus detection position in an imaging screen can be calculated.

$$H = |X| \quad (2)$$

In step S140, an effective aperture value Feff is calculated by Expression (3) using the aperture value F under the shooting conditions, and the light quantity information V (X) calculated in step S130.

$$Feff = \frac{F}{V(X)} \quad (3)$$

FIGS. 12A and 12B are schematic explanatory diagrams of lens frame vignetting of the first focus detection signal and second focus detection signal. The reason why the reference aperture value at the middle image height of the imaging device is corrected using the light quantity information V and the effective aperture value is calculated will be described with reference to FIGS. 12A and 12B.

FIG. 12A illustrates the relationship between the first pupil partial area 501 of the first focus detection pixel 201 and second pupil partial area 502 of the second focus detection pixel 202 at the peripheral image height of the imaging device, and the exit pupil 400 of the imaging optical system, in a case of lens frame vignetting due to a single circular frame. In a case of the single lens frame vignetting illustrated in FIG. 12A, the base length is the length of BL1.

However, in a case where the lens aperture value is at the open side and the image height of the imaging device is high, the multiple lens and aperture frames cause lens frame vignetting.

FIG. 12B illustrates the relation between the first pupil partial area 501 of the first focus detection pixel 201 and second pupil partial area 502 of the second focus detection pixel 202 at the peripheral image height of the imaging device, and the exit pupils 400 and 401 of the imaging optical system, in a case of lens frame vignetting due to multiple lens and diaphragm frames. In the case of lens frame vignetting due to multiple lens frames and diaphragm frames illustrated in FIG. 12B, the base line length is the length of BL3. Vignetting is being caused by multiple (two)

lens frames, so the base line length BL3 is shorter than the base line length BL1 in FIG. 12A. The vignetting by multiple lens and diaphragm frames results in a tendency for the effective aperture value to be generally darker than the reference aperture value at the middle image height, and the base line length to be shorter.

Description will be now be given regarding the reason why the effective aperture value is calculated from the reference aperture value, using the light quantity information illustrated in FIG. 13. Difference in aperture value is manifested in difference in light quantity. The light quantity information in FIG. 13 is information of light quantity reduction due to lens frame vignetting, stored for each lens to be used for exposure adjustment. Accordingly, the amount of change (amount of reduction) of light quantity at each image height can be found with the middle image height as a reference. Consequently, the effective aperture value can be calculated by multiplying the reference aperture value by an inverse of the amount of change of light quantity.

In step S150, a conversion coefficient K (X, Y) stored in a table as illustrated in FIG. 11, is selected according to the combination of effective aperture value Feff calculated in step S140 and the exit pupil distance PO of the imaging optical system. The conversion coefficient also changes in accordance to the image height of the focus detection area. Change in the conversion coefficient due to difference in image height is handled in the first embodiment by dividing the focus detection area into a plurality by image height, and storing a table illustrated in FIG. 11 for each divided area.

In step S160, the detection defocus amount Def is calculated by Expression (5).

$$\text{Def} = \frac{K(X, Y) \times p}{1 - \frac{K(X, Y) \times p}{PO}} \quad (5)$$

Thus ends detailed description of step S100 in FIG. 7.

In step S070, in a case where the absolute value of the detection defocus amount Def is greater than a predetermined value 1, the flow advances to step S080. Lens driving is performed according to the detection defocus amount Def in step S080, and the flow returns to step S010.

In a case where the absolute value of the detection defocus amount Def is not greater than the predetermined value 1 in step S070, determination is made that the current state is in the neighborhood of the optical focus position for the imaging optical system, and accordingly the focus adjusting operation ends.

In step S200, the exposure amount of the shot image is calculated. The calculation method of the exposure amount, and the calculation method of the light quantity information V for imaging, will be described with reference to FIG. 13. Decrease in marginal illumination at the peripheral image height occurs concentrically with the center of the image as the peak, so in a case where the focus detection area image height is (X, Y), the image height H is calculated according to Expression (6).

$$H = \sqrt{X^2 + Y^2} \quad (6)$$

Calculation of the light quantity information using the image height H calculated in Expression (6) may be performed by selecting the light quantity information V of the closest image height H, in the same way as in the case of focus detection, or may be performed by performing interpolation calculation using two points of light quantity information near the image height and calculating the light quantity information V.

The reason why the light quantity information illustrated in FIG. 13 is necessary at the time of adjusting exposure will be described. In a case where the subject is at a position where image height is high, and exposure is set according to the subject without taking into consideration the decrease in marginal illumination, the brightness is adjusted based on a portion where the light quantity has decreased, and as a result the middle portion is overexposed. This decrease in marginal illumination differs from one lens to another, so normally, each lens has its own unique light quantity information.

FIG. 9 is a flowchart illustrating the details of step S200.

First, in step S210, photometric quantity L is obtained for each image height (X, Y). In step S220, light quantity information V (R) is calculated for each image height size R=|(X, Y)|. In step S230, the photometric quantity L/V (R) following correction is calculated. In step S240, the exposure amount is calculated in accordance with the corrected photometric quantity.

In step S090 in FIG. 7, photography is performed based on the exposure amount calculated in step S200, thereby obtaining an image.

FIG. 14 illustrates the way in which focus detection accuracy is improved by calculating conversion coefficients more accurately. The dotted line in FIG. 14 represents focus detection results in a case of using the reference aperture value, the heavy line represents focus detection results in a case of using the effective aperture value, and the light line represents an ideal line in a case where the set defocus amount and detection defocus amount agree.

Calculating the effective aperture value using the light quantity information, and calculating the conversion coefficient thereupon, makes the base line shorter. The conversion coefficient is the inverse of the base line, so the conversion coefficient itself becomes a greater value. Accordingly, performing conversion coefficient calculation using the effective aperture value improves the detection defocus amount in the direction of being greater, as compared to a case where focus detection is performed using the reference aperture value.

Conversion coefficients from phase difference amount to detection defocus amount normally are values which have to be individually calculated for each of a vast number of combinations of optical properties of the imaging device unique to the imaging apparatus, and lens information unique to each exchangeable lens (focus position, zoom position, aperture value, lens frame, diaphragm frame, etc.).

In the first embodiment, lens information unique to the exchangeable lens is divided into light quantity information due to vignetting from multiple lens frames, unique to each type of exchangeable lens, and aperture value and exit pupil distance information of the lens, which can be shared among the exchangeable lenses. The light quantity information unique to each type of exchangeable lens is individually held in each exchangeable lens. On the other hand, conversion coefficients from phase difference amount to detection defocus amount are calculated according to the aperture value and exit pupil distance information of the lens which can be shared among the exchangeable lenses, and optical properties of the imaging device unique to the imaging apparatus, and stored in the imaging apparatus side. This enables light quantity information at the exchangeable lens side and conversion coefficients at the imaging apparatus side to be held independently. Also, using combinations of both information enables conversion coefficients suitable for the combinations of each exchangeable lens and each imaging apparatus to be calculated in a highly accurate manner.

The above-described configuration enables improved calculation accuracy for conversion coefficients necessary for conversion of phase difference amount among focus detection signals into defocus amount, for each type of exchangeable lens, thereby improving focus detection performance.

Second Embodiment

Focus Detection

Figure 15:
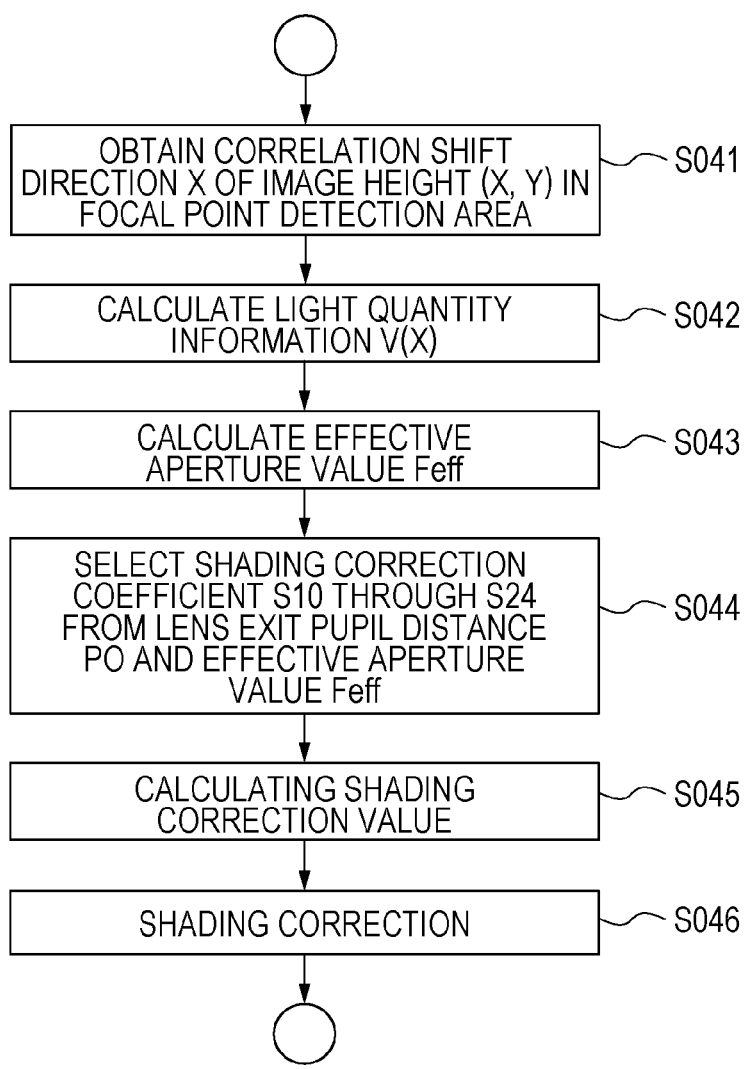
FIG. 15 is a flowchart illustrating shading correction processing according to a second embodiment of the present invention.

Next, a case of performing calculation using light quantity information in the shading correction processing described in step S040 in FIG. 7 will be described in detail. FIG. 15 illustrates shading correction processing in detail.

In step S041, the correlation shift direction (image height in the horizontal direction, which is the pupil division direction in the first embodiment) X in the image height (X, Y) in the focus detection area is obtained.

In step S042, light quantity information V (X) corresponding to an absolute value |X| in the correlation shift direction X of the image height in the focus detection area is obtained in the same way as with step S130 in FIG. 8.

In step S043, the effective aperture value Feff is calculated by Expression (3) using the aperture value F which is a shooting condition, and the light quantity information V (X) calculated in step S041.

FIG. 16 illustrates a table of shading correction coefficients, where the coefficients of each order of an image height function are stored in accordance to aperture value and exit pupil distance, in order to calculate shading correction coefficients which change according to image height.

In step S044, a shading correction coefficient S10 to S24 is selected using the effective aperture value calculated in step S043, and exit pupil distance of the imaging lens.

In step S045, the shading correction coefficient selected in step S044 is used to calculate a first shading correction value S1 (X, Y) of the first focus detection signal and a second shading correction value S2 (X, Y) of the second focus detection signal, by Expressions (7) and (8).

$$S1(X,Y)=s10+s11\times X+s12\times Y+s13\times X^2+s14\times X\times Y+s15\times Y^2 \quad (7)$$

$$S2(X,Y)=s20+s21\times X+s22\times Y+s23\times X^2+s24\times X\times Y+S25\times Y^2 \quad (8)$$

In step S046, shading correction is performed using the shading correction values S1 (X, Y) and S2 (X, Y) calculated in step S045.

An example has been illustrated in the first embodiment where the defocus conversion coefficients are stored as fixed values for each image height, as illustrated in FIG. 13. In the second embodiment, coefficients for image height are stored in the same way as shading correction coefficients, as illustrated in FIG. 17, and defocus conversion coefficients are calculated as a function of the image height, as shown in Expression (9), in order to reduce the storage capacity of memory in a trade-off for a greater amount of calculations.

$$K(X,Y)=k0+k1\times X+k2\times Y \quad (9)$$

In step S150, a conversion coefficient K (X, Y) stored in a table according to combination of aperture value and exit pupil distance, is selected according to the combination of effective aperture value Feff calculated in step S140 and the exit pupil distance PO of the imaging optical system.

Otherwise, the second embodiment is the same as the first embodiment. The above-described configuration enables improved calculation accuracy for conversion coefficients necessary for conversion of phase difference amount among focus detection signals into defocus amount, for each type of exchangeable lens, thereby improving focus detection performance.

The processing illustrated in FIGS. 7 through 9 and 15 are realized by a program for realizing the processes described above being read out from unshown memory, and executed by the control unit 121 or the like, thereby realizing the functions thereof.

This enables improved calculation accuracy for conversion coefficients necessary for conversion of phase difference amount among focus detection signals into defocus amount, thereby improving focus detection performance. Moreover, highly accurate shading correction can be performed with reduced calculation processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-138336, filed on Jul. 1, 2013, which is hereby incorporated by reference herein in its entirety.

What is claimed is:

1. A focus detection apparatus, which performs focus detection by calculating a defocusing amount of an imaging optical system based on signals output from an imaging device, the focus detection apparatus comprising:
   at least one processor or one circuitry that
   detects a phase difference based on the signals output from the imaging device,
   acquires light quantity information of the imaging optical system, the light quantity information being determined according to a focus detection position in an imaging screen,
   sets a conversion coefficient according to the light quantity information, an aperture value which is a shooting condition and an exit pupil distance, and
   calculates the defocusing amount based on the phase difference and the conversion coefficient.

2. The focus detection apparatus according to claim 1, wherein the processor or the circuitry acquires the light quantity information according to an image height component in a calculated direction of the phase difference.

3. The focus detection apparatus according to claim 1, wherein the processor or the circuitry adjusts exposure using the light quantity information.

4. An imaging apparatus comprising:
an imaging device in which there are arrayed a plurality of
a first photoelectric converter which receives a light flux which has passed through a first pupil-divided area of the imaging optical system, and
a second photoelectric converter which receives a light flux which has passed through a second pupil-divided area of the imaging optical system which differs from the first pupil-divided area; and
at least one processor or one circuitry that
detects a phase difference based on an output signal from the first photoelectric converter and an output signal from the second photoelectric converter,
acquires light quantity information of the imaging optical system, according to a focus detection position in an imaging screen,
sets a conversion coefficient according to the light quantity information, an aperture value which is a shooting condition and an exit pupil distance, and
calculates the defocusing amount based on the phase difference and the conversion coefficient.

5. A non-transitory recording medium storing a program causing a computer to function as the processor or the circuitry of the focus detection apparatus according to claim 1.

6. A focus detection apparatus which performs focus detection based on output signals from an imaging device in which there are arrayed a plurality of a first photoelectric converter which receives a light flux which has passed through a first pupil-divided area of the imaging optical system, and a second photoelectric converter which receives a light flux which has passed through a second pupil-divided area of the imaging optical system which differs from the first pupil-divided area, the focus detection apparatus comprising:
at least one processor or one circuitry that
generates a first focus detection signal based on the output signal of the first photoelectric converter and a second focus detection signal based on the output signal of the second photoelectric converter,
acquires light quantity information of the imaging optical system, the light quantity information being determined according to a focus detection position in an imaging screen,
converts, based on the light quantity information, an aperture value which is a shooting condition into an effective aperture value according to the focus detection position,
sets a correction value according to the effective aperture value and an exit pupil distance,
corrects the first focus detection signal and the second focus detection signal using the correction value,
calculates a phase difference based on the corrected first focus detection signal and the corrected second focus detection signal, and
detects a defocus amount based on the phase difference and a conversion coefficient.

7. A non-transitory recording medium storing a program for causing a computer to function as the processor or the circuitry of the focus detection apparatus according to claim 6.

8. A control method of a focus detection apparatus, which performs focus detection by calculating a defocus amount of an imaging optical system based on signals output from an imaging device, the method comprising:
detecting phase difference based on the signals output from the imaging device;
acquiring light quantity information of the imaging optical system, according to a focus detection position in an imaging screen;
setting a conversion coefficient according to the light quantity information, an aperture value which is a shooting condition and an exit pupil distance; and
calculating the defocusing amount based on the phase difference and the conversion coefficient.

9. A control method of a focus detection apparatus which performs focus detection based on output signals from an imaging device in which there are arrayed a plurality of a first photoelectric converter which receives a light flux which has passed through a first pupil-divided area of the imaging optical system, and a second photoelectric converter which receives a light flux which has passed through a second pupil-divided area of the imaging optical system which differs from the first pupil-divided area, the method comprising:
generating a first focus detection signal based on the output signal of the first photoelectric converter and a second focus detection signal based on the output signal of the second photoelectric converter;
acquiring light quantity information of the imaging optical system, according to image height in an imaging screen;
converting, based on the light quantity information, an aperture value which is a shooting condition into an effective aperture value according to the image height,
setting a correction value according to the effective aperture value and an exit pupil distance;
correcting the first focus detection signal and the second focus detection signal using the correction value;
calculating a phase difference based on the first focus detection signal and the second focus detection signal; and
detecting a defocus amount based on the phase difference and a conversion coefficient.

10. The focus detection apparatus according to claim 1, wherein the processor or the circuitry converts, based on the light quantity information, the aperture value into an effective aperture value, and sets the conversion coefficient according to the effective aperture value and the exit pupil distance.

11. The focus detection apparatus according to claim 1, wherein the processor or the circuitry acquires the light quality information from an exchangeable lens having the imaging optical system.

12. The focus detection apparatus according to claim 1, wherein the imaging device includes a plurality of microlenses being arrayed two-dimensionally over a plurality of photoelectric converters.

13. The focus detection apparatus according to claim 12, wherein each of the plurality of microlenses which the imaging device includes is arranged over the plurality of photoelectric converters.

14. The focus detection apparatus according to claim 1, further comprising:

a memory that stores information indicating relations with light quantity information, an aperture value, an exit pupil distance and a conversion coefficient, wherein the processor or the circuitry sets the conversion coefficient according to the information stored in the memory, the acquired light quantity information, the aperture value which corresponds to the shooting condition and the exit pupil distance.

15. The focus detection apparatus according to claim 1, further comprising:

a memory that stores information indicating relations with an effective aperture value according an image height, an exit pupil distance and a conversion coefficient, wherein the processor or the circuitry converts, based on the light quantity information, the aperture value into an effective aperture value, and wherein the processor or the circuitry sets the conversion coefficient according to the information stored in the memory, the converted effective aperture value and the exit pupil distance.

16. The focus detection apparatus according to claim 1, wherein the light quantity information is information of light quantity reduction.

17. The focus detection apparatus according to claim 6, wherein the light quantity information is information of light quantity reduction.

18. An imaging apparatus, which performs calculating a defocusing amount of an imaging optical system based on signals output from an imaging device, the imaging apparatus comprising:

at least one processor or one circuitry that acquires vignetting information of the imaging optical system, the vignetting information being determined according to a focus detection position in an imaging screen, sets a conversion coefficient, which relates to a base length corresponding to an interval between divided pupil areas of the imaging optical system, to convert a phase difference for calculating the defocusing amount according to the vignetting information, an aperture value which is a shooting condition and an exit pupil distance, and calculates the defocusing amount based on the phase difference determined from the signals and the conversion coefficient.

19. The imaging apparatus according to claim 18, wherein the processor or the circuitry acquires the vignetting information according to an image height component in a calculated direction of the phase difference.

20. The imaging apparatus according to claim 18, wherein the processor or the circuitry adjusts exposure using the vignetting information.

21. The imaging apparatus according to claim 18, wherein the processor or the circuitry converts, based on the vignetting information, the aperture value into an effective aperture value, and sets the conversion coefficient according to the effective aperture value and the exit pupil distance.

22. The imaging apparatus according to claim 18, wherein the processor or the circuitry acquires the vignetting information from an exchangeable lens having the imaging optical system.

23. The imaging apparatus according to claim 18, wherein the vignetting information relates to a lens frame of the imaging optical system.

24. The imaging apparatus according to claim 18, wherein the vignetting information relates to a lens frame vignetting due to multiple lens and diaphragm frames included in the imaging optical system.

25. The imaging apparatus according to claim 18, wherein the vignetting information is information to determine a shape of an exit pupil of the imaging optical system in accordance with an image height.

26. The imaging apparatus according to claim 18, wherein the vignetting information is information to determine a pupil area of the imaging optical system through which light fluxes have passed.

* * * * *